Figure 1:
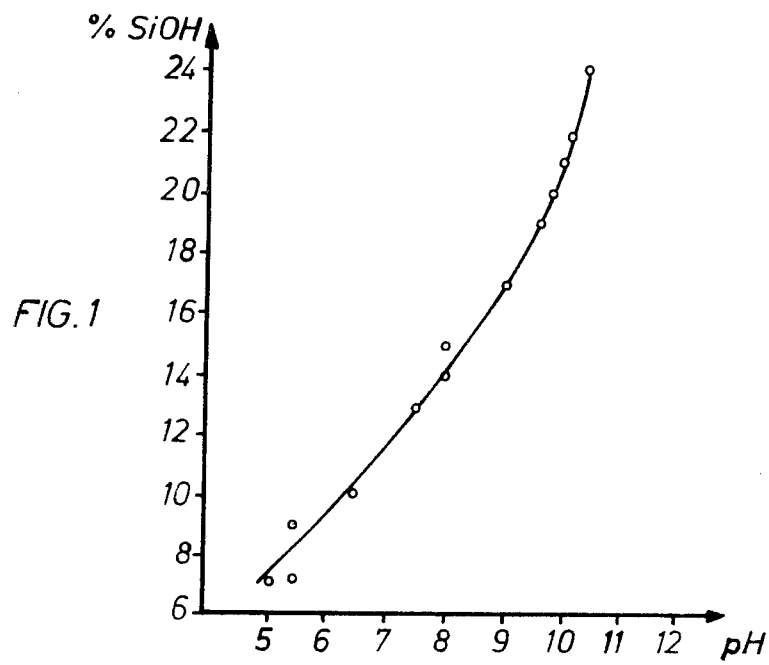

United States Patent [19]
Lücking et al.

[11] 3,939,195
[45] Feb. 17, 1976

[54] PREPARATION OF SILANOL CONTAINING ORGANOPOLYSILOXANES

[75] Inventors: Hans Joachim Lücking, Bergisch-Neukirchen; Klaus Seyfried, Schildgen; Werner Buchner, Opladen-Luetzenkirchen; Karl-Heinz Rudolph, Cologne-Stammheim, all of Germany

[73] Assignee: Bayer Aktiengesellschaft, Leverkusen, Germany

[22] Filed: Jan. 7, 1975

[21] Appl. No.: 539,150

[30] Foreign Application Priority Data
Jan. 24, 1974   Germany............................ 2403303

[52] U.S. Cl. 260/448.2 E; 260/46.5 R; 260/448.8 R
[51] Int. Cl.² ........................................... C07F 7/08
[58] Field of Search ............................ 260/448.2 E

[56]          References Cited
          UNITED STATES PATENTS
3,309,390   3/1967   Omietanski ................. 260/448.2 E
3,409,588   11/1968  LeFort et al. ............. 260/448.2 E X
3,442,925   5/1969   Simmler et al. ............. 260/448.2 E
3,449,392   6/1969   Robinson ..................... 260/448.2 E
3,542,837   11/1970  Swihart ....................... 260/448.2 E
3,853,932   12/1974  Razzano ....................... 260/448.2 E

*Primary Examiner*—Paul F. Shaver
*Attorney, Agent, or Firm*—Burgess, Dinklage & Sprung

[57]            ABSTRACT

A process for the preparation of an organopolysiloxanol comprising contacting at least one organochlorosilane of the formula $(CH_3)_a(C_2H_5)_b(CH_2=CH-)_c SiCl_{4-a-b-c}$ wherein
$a$, $b$ and $c$ is 0, 1, 2 or 3
and wherein
$2 \leq a+b+c \leq 3$ at a temperature of about $-10°$ to $90°C$ with water containing $NH_4Cl$ in an amount from 1 to 100 percent of its saturation concentration, the pH value of the aqueous solution being adjusted to between about 7.5 and 11.6 by introduction of $NH_3$, separating the hydrolyzate from the aqueous solution immediately after hydrolysis, and flushing the hydrolyzate with an inert gas, to remove $NH_3$ therefrom.

5 Claims, 2 Drawing Figures

PREPARATION OF SILANOL CONTAINING ORGANOPOLYSILOXANES

The present invention relates to an improved process for the preparation of organopolysiloxanes which are distinguished by a high content of silanol groups. Such compounds can be used, for example, as structure-improving additives to silicone rubber mixtures. They are also used for treating pulverulent materials to give them particular properties, for example to achieve better wettability of pigments by binders. They can also be used for the controlled synthesis of copolymeric siloxanes.

The fact that SiOH groups condense in the presence of acids or alkalis is generally known and is extensively utilized in the preparation and processing of polysiloxanes.

This fact is also utilized in the processes which are customary, according to the state of the art, for the preparation of silanols which condense readily, several approaches being open:

A. Silanes which split off only weak acids on hydrolysis, are hydrolyzed. Acyloxysilanes, especially acetoxysilanes, are generally more suitable for the preparation of silanols and of polysiloxanes rich in silanol groups than are halogenosilanes.

B. Silanes which do not produce any acids or bases on hydrolysis, such as dimethyldimethoxysilane or dimethyldiethoxysilane, are hydrolyzed.

C. The hydrolysis is carried out under such conditions that acids or bases formed are neutralized immediately; this method is used extensively. If, for example, metered addition of a base during the hydrolysis is used to ensure that the resulting hydrogen halide is neutralized immediately, it is possible to prepare even condensation-sensitive silanols or polysiloxane-polyols from diorganodichlorosilanes. In order not to affect the silanol groups, it is also possible to neutralize the mixture during the hydrolysis, for example with $MgCO_3$, $CaCO_3$ or MgO, or to react the organohalogenosilanes with alkali metal bicarbonate; conversely, an excess of alkali used during the hydrolysis accelerates the condensation so that the addition of an organohalogenosilane to an excess of an alkaline solution leads substantially to high-molecular siloxanes as taught by W. Noll, Chemie und Technologie der Silicone (Chemistry and Technology of the Silicones), 1968, page 83 et seq., 166/167.

It is also for this reason that alkaline hydrolysis processes are in general only employed when it is intended to achieve the hydrolysis of relatively hydrolysis-resistant organohalogenosilanes such as, for example, trifluoropropylmethyldichlorosilane or other fluoroorganohalogenosilanes.

All these processes suffer from considerable disadvantages: if procedure (A) is used, special silanes, which must be prepared particularly for the purpose from the organochlorosilanes in a separate process, are required as starting materials. This adds substantially to the cost of process (A). The same is true for the procedure according to process (B), for which special silanes must also be prepared. If process (C) is followed, it is found that it is technically very difficult to neutralize the acids formed during the hydrolysis uniformly by addition of bases in such a way that the hydrolysis product does not come into contact with acids or bases; local excess concentrations of acids or bases cannot be avoided and hence the control of the reaction is so uncertain that this process only gives silanol-containing polysiloxanes with greatly fluctuating silanol contents. Furthermore, polysiloxane-polyols rich in methyl groups and having an SiOH content of 18–20 percent by weight and above cannot be prepared in accordance with this process, or can only be prepared in low yields. If, on the other hand, suspensions of $CaCO_3$, $MgCO_3$ or MgO are used to neutralize the acid, large amounts of liquid are required to be able to prepare the suspensions. In addition, the suspensions of the carbonates foam greatly, so that the silanes can only be metered in slowly. Furthermore, the difficulties which can frequently be observed in reactions between solid and liquid materials, such as inadequate homogeneity of the reaction medium, crust formation on the surface of the solid and blockages, and caking on the walls, of the reactor occur.

It is accordingly an object of the present invention to avoid these disadvantages. This object is realized in accordance with the present invention which relates to a process for the preparation of an organopolysiloxanol comprising contacting at least one organochlorosilane of the formula

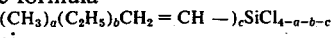

$(CH_3)_a(C_2H_5)_b(CH_2=CH-)_cSiCl_{4-a-b-c}$ wherein $a$, $b$ and $c$ is 0, 1, 2 or 3 and wherein $2 \leq a+b+c \leq 3$ or mixtures of such silanes, optionally mixed further with up to 30 mol percent of diphenyldichlorosilane or up to 40 mol percent of methyltrichlorosilane, ethyltrichlorosilane or vinyltrichlorosilane, by contact with an alkaline aqueous solution, which is characterised in that the hydrolysis is carried out in a circulatory device at temperatures between −10° and 90°C by means of an aqueous solution of ammonia and ammonium chloride, the $NH_4Cl$ content of the aqueous solution being between 1 and 100 percent of the saturation concentration and the pH value of the aqueous solution being adjusted to values between 7.5 and 11.6 by introduction of $NH_3$, and that the continuously obtained hydrolysate is separated off from the aqueous solution immediately after the hydrolysis of the silanes and freed from $NH_3$ which is still present by flushing with air or some other inert gas.

In a preferred embodiment of the process according to the invention the $NH_4Cl$ content of the aqueous solution should be approximately 10 to 70 percent of the saturation concentration and the pH value should be approximately between 10 and 10.5. The temperature during the hydrolysis is best kept between about 20° and 60°C.

It is quite necessary that the process is effected continuously and the hydrolyzate is promptly and approximately separated into an aqueous $NH_4Cl$-containing solution, which is at least partially recycled for further reaction after addition of fresh organochlorosilane and $NH_3$, and a silanol-containing phase admixed with water, which is treated to remove the water and any $NH_3$ contained therein.

Figure 2:
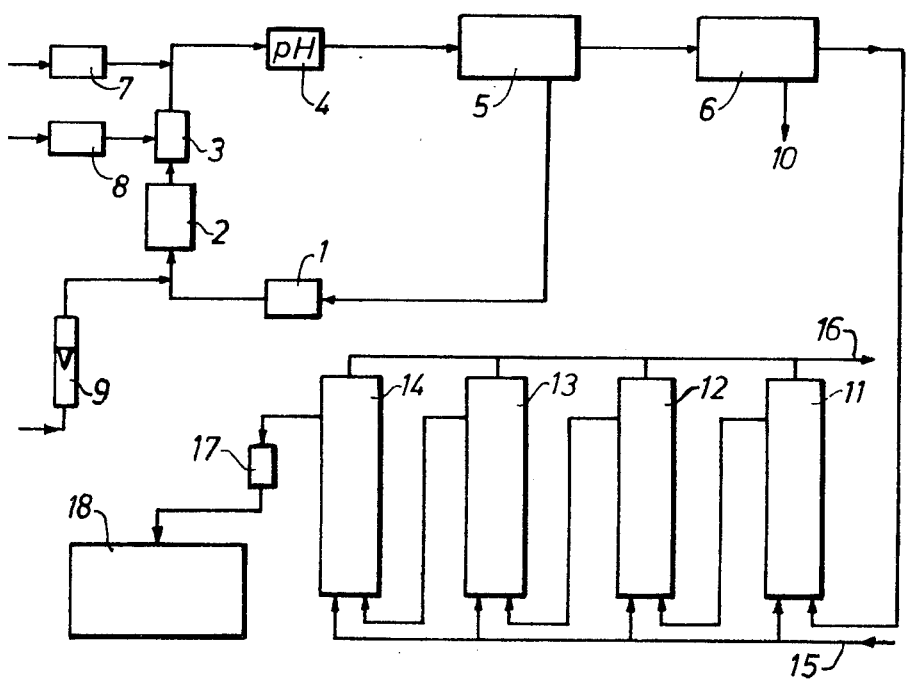

The invention will be further described with reference to the accompanying drawing, wherein:

FIG. 1 is a plot of SiOH content of the product against the pH of the hydrolysis solution; and FIG. 2 is a flow sheet of a process for carrying out the present invention.

Surprisingly, it has been found that the SiOH content of the polysiloxanes, for example of the abovementioned composition, prepared according to the invention increases directly with the pH value of the NH₄Cl solution described above during hydrolysis, i.e. the condensing action of the solution on the resulting polysiloxanes is overcome if the polyols, immediately after isolation from the hydrolysis medium, are rapidly freed from adhering $NH_3$ as by flushing the polyols with air or some other inert gas. FIG. 1 is a curve of the SiOH content of various polyols, prepared under otherwise identical experimental conditions, plotted against the pH value of the $NH_4Cl$ solution used.

The curve shows that the SiOH content of the polysiloxane-polyols can be adjusted very simply and with good reproducibility to the desired value by varying the pH value of the ammonium chloride solution. This is not possible in such a simple and reliable manner in any of the abovementioned processes according to the state of the art.

The process according to the invention is preferably carried out in a re-circulating apparatus which is shown schematically in FIG. 2 and is described in more detail below:

In FIG. 2, 1, 7 and 8 represent pumps, 2 represents a condenser, 3 represents a mixing chamber, 4 represents a pH meter, 5 and 6 represent separators, 9 represents a flow meter, 10 a discharge line, 11, 12, 13 and 14 represent flushing columns, 17 represents a filter and 18 represents a container.

The circulation of an aqueous solution of $NH_4Cl$ and $NH_3$ takes place via the pump 1, the condenser 2, the mixing chamber 3, the pH meter 4 and the preliminary separator 5. $NH_3$ is fed in, according to the desired SiOH content and the pH value indicated at 4, via the flow meter 9. The silanes are introduced into the mixing chamber 3 via the metering pump 8. Water is fed in via the metering pump 7.

The $NH_4Cl$ content of the solution can easily be adjusted to the desired value, at constant supply of silane and at a given flow of $NH_3$, by varying the amount of water fed in. The hydrolysate formed, and the excess $NH_4Cl$, which is removed in the form of its aqueous solution, are discharged into vessel 5 where there is a preliminary separation, aqueous $NH_4Cl$ possibly containing some product being recirculated to pump 1 with removal of any solid $NH_4Cl$ which might come out. The organic material admixed with much aqueous solution passes to vessel 6 where the complete separation of the hydrolyzate from the aqueous phase is carried out in a special separator. The aqueous phase leaves the separator at 10 and the hydrolyzate passes into the bubble cap columns 11 to 14 in which air or some other inert gas is introduced from below. The waste air leaves the columns at 16 and the flushed polysiloxane-polyol passes via the filter 17 into the production collector 18.

The process according to the invention will be explained in more detail still with the aid of the examples which follow (percentages quoted relate to percent by weight, unless stated otherwise):

EXAMPLE 1

An aqueous solution of ammonium chloride in water was circulated as the hydrolysis medium in the circulatory apparatus according to FIG. 2. The solution was adjusted to pH 10.0 by metering in gaseous $NH_3$. 1.4 l of dimethyldichlorosilane and 5 l of water were metered hourly into this solution via the metering pumps 7 and 8. The pH value was kept between 10 and 10.5 by introducing further gaseous $NH_3$. After a steady state had been reached, an average of 600 g of polysiloxane-polyol per hour was removed downstream of the filter. The oil had an SiOH content of 22.4 percent by weight and an $NH_3$ content of 14 ppm. The temperature of the hydrolysis medium was 36°C and the $NH_4Cl$ content of the aqueous phase was 20.0 percent by weight.

EXAMPLE 2

8 l of dimethyldichlorosilane per hour were fed via the metering pump 8 into the loop in the installation according to Example 1; the amount of water introduced was about 29 l per hour. The pH value was kept at 9.7 ± 0.2; the hydrolysis took place at about 40°C. In the steady state, an average of 4,600 g of oil per hour was removed downstream of the filter. The SiOH content was 19.8 percent and the $NH_4Cl$ content of the aqueous phase was about 19.5 percent by weight.

EXAMPLE 3

The conditions of Example 2 were retained except that the amount of water introduced per hour was doubled. This lowered the hydrolysis temperature to 38°C; in the steady state, the $NH_4Cl$ content of the aqueous phase was about 10.0 percent by weight. Thereafter, the amount of water was reduced until solid $NH_4Cl$ precipitated from the solution in the installation. The oil then obtained had an SiOH content of 19.4 percent.

EXAMPLE 4

The conditions of Example 2 were retained except that the pH value was lowered by 0.2 unit at a time over the course of a prolonged period. Table 1 below shows the relationship between the pH value and the SiOH content:

Table 1

| Selected pH value | Resulting SiOH content |
|---|---|
| 10.2 | 24.8/24.1% |
| 10.0 | 22.4% |
| 9.8 | 21.3% |
| 9.6 | 19.0% |

EXAMPLE 5

The conditions of Example 1 were retained except that the pH value was lowered progressively throughout the process. After the steady state had become established in each trial, the SiOH content of the oil obtained was examined. The pH value and the corresponding SiOH content are listed in Table 2:

Table 2

| Selected pH value | Resulting SiOH content |
|---|---|
| 9.0 | 17.2% |
| 8.0 | 13.9% |
| 7.5 | 12.8% |
| 6.5 | 10.0% |
| 5.5 | 7.1% |

EXAMPLE 6

A silane mixture which consisted of 95 percent by weight of dimethyldichlorosilane and 5 percent by weight of vinylmethyldichlorosilane was fed into the hydrolysis apparatus in place of dimethyldichlorosilane, under the conditions of Example 2. The resulting oil had an SiOH content of 19.0 percent.

EXAMPLE 7

A silane mixture of 90 percent by weight of dimethyldichlorosilane and 10 percent by weight of vinylmethyldichlorosilane was fed in under the conditions of Example 2. The SiOH content of the resulting oil was about 18.8 percent.

EXAMPLE 8

A silane mixture of 60 percent by weight of dimethyldichlorosilane and 40 percent by weight of vinylmethyldichlorosilane was hydrolyzed at pH 10–10.5 under the conditions of Example 2. The SiOH content of the resulting oil was about 21.9 percent.

EXAMPLE 9

A silane mixture of 95 percent by weight of dimethyldichlorosilane and 5 percent by weight of diphenyldichlorosilane was hydrolyzed at pH 10–10.5 under the conditions of Example 2. The SiOH content of the resulting oil was 24.5 percent.

EXAMPLE 10

A silane mixture of 90 percent by weight of dimethyldichlorosilane and 10 percent by weight of diphenyldichlorosilane was hydrolyzed under the conditions of Example 2. The resulting oil analyzed 16.7 percent by weight of SiOH. A silane mixture containing 20 percent of diphenyldichlorosilane gave, under the same conditions, an oil with 13.5 percent of SiOH.

EXAMPLE 11

A mixture of 85 percent by weight of dimethyldichlorosilane and 15 percent by weight of methyltrichlorosilane was hydrolyzed in the installation according to FIG. 2, under the conditions of Example 2, at a pH value of 10–10.5. The resulting oil had an SiOH content of 19.5 percent.

EXAMPLE 12

A silane mixture of 70 percent by weight of dimethyldichlorosilane and 30 percent by weight of methyltrichlorosilane was hydrolyzed under the conditions of Example 11. The resulting oil had an SiOH content of 18.2 percent.

Under the same conditions, a silane mixture with 40% of methyltrichlorosilane gave an oil with 17 percent of SiOH, but already contained substantial amounts of gel-like by-products.

EXAMPLE 13

A mixture of 90 percent by weight of dimethyldichlorosilane, 5 percent by weight of vinylmethyldichlorosilane and 5 percent by weight of diphenyldichlorosilane was hydrolyzed under the conditions of Example 2, at pH 10–10.5. The resulting oil had an SiOH content of 20.0 percent.

EXAMPLE 14

By adding vinylmethyldichlorosilane, its content in the mixture of Example 13 was raised to 10 percent by weight; an oil with an SiOH content of 16.4 percent was obtained under the conditions of Example 2.

It will be appreciated that the instant specification and examples are set forth by way of illustration and not limitation, and that various modifications and changes may be made without departing from the spirit and scope of the present invention.

What is claimed is:

1. The process for the preparation of an organopolysiloxanol comprising contacting at least one organochlorosilane of the formula

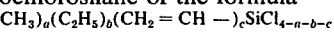

wherein
    $a$, $b$ and $c$ is 0, 1, 2, or 3 and wherein
    $2 \leq a+b+c \leq 3$ at a temperature of about −10° to 90° C with water containing $NH_4Cl$ in an amount from 1 to 100% of its saturation concentration, the pH value of the aqueous solution being adjusted to between about 7.5 and 11.6 by introduction of $NH_3$, separating the hydrolyzate from the aqueous solution immediately after hydrolysis, and flushing the hydrolyzate with an inert gas, to remove $NH_3$ therefrom.

2. The process of claim 1, wherein the organochlorosilane is mixed with diphenyldichlorosilane in an amount such that the organochlorosilane constitutes at least about 70 mole percent of the mixture, or with methyltrichlorosilane, ethyltrichlorosilane or vinyltrichlorosilane in an amount such that the organotrichlorosilane constitutes at least about 60 mole percent of the mixture.

3. The process of claim 1, wherein the $NH_4Cl$ is present in about 10° to 70 percent of its saturation concentration, the pH is about 10 to 10.5 and the temperature is about 20° to 60°C.

4. The process of claim 1, wherein the reaction is effected continuously and the $NH_4Cl$-containing aqueous separated from the hydrolyzate is recycled at least in part.

5. The process of claim 2, wherein the reaction is effected continuously and the $NH_4Cl$ is present in about 10 to 70 percent of its saturation concentration, the pH is about 10 to 10.5 and the temperature is about 20° to 60°C.

* * * * *